（12） United States Patent
Schlipf et al.

(10) Patent No.: US 11,807,369 B2
(45) Date of Patent: Nov. 7, 2023

(54) HEATED LEADING EDGE STRUCTURE FOR AN AIRCRAFT

(71) Applicant: Airbus Operations GmbH, Hamburg (DE)

(72) Inventors: Bernhard Schlipf, Hamburg (DE); Alexander Huber, Hamburg (DE); Timo Stöven, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 0 days.

(21) Appl. No.: 17/699,333

(22) Filed: Mar. 21, 2022

(65) Prior Publication Data

US 2022/0306301 A1   Sep. 29, 2022

(30) Foreign Application Priority Data

Mar. 23, 2021  (DE) .......................... 102021107275.1

(51) Int. Cl.
*B64D 15/12* (2006.01)
*B64C 3/28* (2006.01)

(52) U.S. Cl.
CPC ................ *B64D 15/12* (2013.01); *B64C 3/28* (2013.01)

(58) Field of Classification Search
CPC .............. B64D 15/23; B64C 3/28; B64C 9/22
See application file for complete search history.

(56) References Cited

U.S. PATENT DOCUMENTS

| | | | | |
|---|---|---|---|---|
| 3,896,867 | A * | 7/1975 | Gill | F16B 37/064 411/937.1 |
| 5,489,073 | A | 2/1996 | Leffel et al. | |
| 10,662,877 | B2 * | 5/2020 | Brown | F01D 25/02 |
| 2006/0237582 | A1 * | 10/2006 | Layland | B64D 15/12 244/53 R |
| 2016/0009400 | A1 * | 1/2016 | English | B64D 15/22 62/139 |
| 2018/0304543 | A1 * | 10/2018 | Mayer | B29C 65/08 |
| 2020/0331616 | A1 * | 10/2020 | Didyk | B64C 3/28 |

FOREIGN PATENT DOCUMENTS

| | | | |
|---|---|---|---|
| EP | 3636417 A1 | 4/2020 | |
| GB | 1576429 | 10/1980 | |
| GB | 2438389 A * | 11/2007 | ............. B64D 15/12 |
| GB | 2438389 A | 11/2007 | |
| GB | 2477339 A | 8/2011 | |

OTHER PUBLICATIONS

Extended European Search Report from corresponding European application No. 221633.9.4-1004, dated Jul. 21, 2022.

* cited by examiner

*Primary Examiner* — Tien Q Dinh
*Assistant Examiner* — Nevena Aleksic
(74) *Attorney, Agent, or Firm* — Greer, Burns & Crain, Ltd.

(57) ABSTRACT

A heated leading edge structure for an aircraft, including a leading edge panel having an outer surface configured to be contacted by an ambient flow, and an inner surface opposite the outer surface, and including a heater device mounted to the inner surface of the leading edge panel for heating of the leading edge panel. The heater device is mounted to the inner surface of the leading edge panel in a detachable manner to provide a simple, lightweight and cost-efficient leading edge structure that enables a simple, quick and efficient maintenance.

17 Claims, 3 Drawing Sheets

HEATED LEADING EDGE STRUCTURE FOR AN AIRCRAFT

CROSS-REFERENCES TO RELATED APPLICATIONS

This application claims the benefit of the German patent application No. 102021107275.1 filed on Mar. 23, 2021, the entire disclosures of which are incorporated herein by way of reference.

FIELD OF THE INVENTION

The present invention relates to a heated leading edge structure for an aircraft, in particular for ice-protection of the leading edge structure. Further aspects of the invention relate to a slat comprising such a leading edge structure, a wing comprising such a leading edge structure or slat, and an aircraft comprising such a leading edge structure, slat or wing.

BACKGROUND OF THE INVENTION

The leading edge structure comprises a leading edge panel and a heater device. The leading edge panel extends along a span direction and in a chord direction extends in a way curved about the span direction and including a leading edge point, which might be the most forward point of the leading edge panel and/or the stagnation point. The leading edge panel has an aerodynamic outer surface configured for contact with an ambient flow, and an inner surface opposite the outer surface and facing the inside of the leading edge structure. The leading edge panel is preferably made of a metal material, such as aluminum, steel or titanium, but might also be formed of other material, such as fiber reinforced plastic material. The heater device, preferably an electrothermal heater device in the form of a heater mat, heater layer, or heater panel, is mounted to the inner surface of the leading edge panel in a way that it covers at least parts, preferably essential parts, of the inner surface, for heating, preferably controlled heating, of the leading edge panel to protect the leading edge panel from icing.

Similar leading edge structures are known in the art. Some known leading edge structures have the heater device in form of an electrothermal heater layer integrated in the structure of the leading edge panel or fixedly attached to the inner surface of the leading edge panel. However, such leading edge structures require the entire leading edge panel to be replaced in case the heater layer needs to be replaced, e.g., during maintenance. Other known leading edge structures have the heater device in the form of an electrothermal heater panel mounted to the outer surface of the leading edge panel in a removable manner Such leading edge structures allow for the heater panel to be easily replaced without needing to replace the entire leading edge panel. However, as the heater panel is outside it must be designed with similar impact tolerance as the leading edge panel, which makes it heavy, complex, and expensive.

SUMMARY OF THE INVENTION

Therefore, the object of the present invention is to provide a simple, lightweight and cost-efficient leading edge structure that enables a simple, quick and efficient maintenance.

This object is achieved in that the heater device is mounted to the inner surface of the leading edge panel in a detachable and preferably interchangeable or replaceable manner, preferably by a non-destructively detachable connection, such as a releasable mounting. In such a way, the heater device can be removed and replaced in a very quick and simple manner during maintenance without the need to replace the entire leading edge panel. Merely, it might be required to dismount the leading edge panel or some other structure, such as a lower panel, back panel or cover, to make the heater device accessible for detachment. This largely simplifies maintenance and reduces costs. At the same time, the heater device does not need to be designed for high impact loads e.g., due to bird strike, since the heater device is arranged at the inner surface of the leading edge panel, which makes the leading edge structure lightweight and cost-efficient.

According to a preferred embodiment, the heater device is formed as a heater mat. The heater mat preferably has a thin, aerial form to cover a wide area of the inner surface of the leading edge panel and take up possibly little space. Further, the heater mat is preferably flexible to avoid delamination upon smaller impacts on the leading edge panel.

According to another preferred embodiment, the heater device is mounted to the inner surface of the leading edge panel by a fastener arrangement comprising at least one discrete releasable fastener. By such a fastener arrangement, the heater device can be quickly, easily and reliably attached and detached.

In particular, it is preferred that the fastener arrangement comprises a plurality of discrete releasable fasteners spaced from one another along the inner surface of the leading edge panel. By using a plurality of distributed fasteners, a continuous and reliable attachment of the heater device can be achieved.

According to a preferred embodiment, the at least one fastener is attached, preferably by adhesive, to the inner surface of the leading edge panel and engages the heater device, in particular a corresponding part at the heater device, including a corresponding fastener part mounted to the heater device. In such a way, a simple and reliable attachment is provided.

In particular, it is preferred that the at least one fastener is formed as a snap connector that can be engaged to and disengaged from the heater device by elastic deformation of the fastener or the heater device. Such a snap connector can provide a quick simple and reliable connection.

Additionally or alternatively, it is preferred that the at least one fastener comprises a pin extending away from the inner surface of the leading edge panel and engaging a hole in the heater device. In such a way, a simple and reliable connection is provided.

It is particularly preferred that the hole is formed as a through hole, preferably extending through the heater device, preferably through the heater mat, from an outer side facing the inner surface of the leading edge panel to an opposite inner side. Preferably, the pin is provided with a retainer device at its free end for retaining and securing the pin in the hole. The retainer device may be formed integrally with the pin or may be mounted to the pin fixedly or removably. In the engaged state the pin extends through the hole such that its free end with the retainer device projects out of the hole, preferably at the inner side of the heater device, and the retainer device secures the pin in the hole, preferably such that the retainer device forms a counter bearing to the inner side of the heater device. In such a way, a simple and reliable connection is provided.

It is further preferred that the retainer device comprises an extended-diameter head formed at the free end of the pin. The head may be formed integrally with the pin or may be mounted to the pin fixedly or removably. Further, the head may rest directly or indirectly against inner side of heater device. The diameter of the hole may be greater, as great, or smaller than the diameter of the head, wherein the material around the hole might be flexible or stretchable. By such a head a very simple and reliable counter bearing is formed. As an alternative to the head, the retainer device might comprise e.g., a nut that is screwed on the free end of the pin, or a latch pin that is inserted in a cross hole or radial hole in the pin.

It is also preferred that the retainer device further comprises a removable retainer element arrangeable around the pin between the inner side of the heater device and the head, preferably such that the retainer element forms a counter bearing to the inner side of the heater device and the head forms a counter bearing to the retainer element. Preferably, the retainer element is formed as an elastic ring that can be pulled over the head by stretching the ring and thus extending the diameter of the ring. The retainer element might also be formed as an open ring with a radial slot having a diameter at least as great as the diameter of the pin below the head, for the ring to be slid onto the pin below the head. Alternatively, the retainer element might also be formed as a slotted plate or a clip. By such a removable retainer element, the heater element can be easily, quickly and reliably secured at the pin without requiring the heater device material to be flexible.

According to a preferred embodiment, the at least one fastener comprises a base member, preferably a base plate, attached to the inner surface of the leading edge panel by adhesive and holding the pin, in particular formed integrally with or mounted to the pin. The base member is preferably formed of a material with a high thermal conductivity, such as metal, so that the heat from the heater device can be transferred to the leading edge panel as unhindered as possible in the area of the base member. Such a base member enables a reliable adhesive connection of the pin to the leading edge panel.

According to a further preferred embodiment, the heater device is additionally attached to the inner surface of the leading edge panel by an adhesive layer, preferably formed between the inner surface of the leading edge panel and the outer side of the heater device. Preferably, the adhesive layer is flexible to avoid delamination upon smaller impacts. Further, the adhesive layer preferably has a high thermal conductivity, preferably above 0.2 W/m*K, further preferred above 0.5 W/m*K, to transfer heat from the heater device to the leading edge panel in an efficient and possibly unhindered way. The adhesive layer preferably further has a relatively low adhesive strength, preferably below 0.4 N/mm (force in N per width of the heater device in mm), to allow easy detachment of the heater device, ideally in a non-destructive manner. In particular, the chemical composition of the adhesive layer is adapted such that it allows a peel of the heater device from the leading edge panel at low forces, preferably ranging below 0.4 N/mm To enable gripping of the heater device by hand or by a simple tool, such as a tang, one or more tabs might be provided preferably along the edges of the heater device. Pulling at these tabs in a direction away from the leading edge panel will lead to the intended peel-off Such a peel loading does not occur in normal aircraft operation. However, peel strength of adhesive joints is generally a lot higher than 0.4 N/mm to give a sufficiently reliable bonding even under unpredicted circumstances, such as mechanical impacts, manufacturing deviations or surface impurities. So, the adhesive layer is preferably formed with a temperature dependency. In particular, the adhesive layer is formed in a way that it sustains the loading spectrum of the normal aircraft operation, but at higher temperatures above the operating temperature window, e.g., above 100° C., which might be applied during maintenance when the heater device is to be removed, the adhesive layer becomes weak enough so that the heater device can be peeled off by hand or by tool from the leading edge panel at peel forces lower that 0.4 N/mm The additional attachment of the heater device by the adhesive layer forms a continuous connection between the heater device and the leading edge panel and enables a continuous heat transfer by conduction.

According to another preferred embodiment, the leading edge structure comprises a lower panel or back panel opposite from the leading edge panel and from the heater device attached thereto. The lower panel or back panel has an access opening preferably closed by a removable cover. Removing the cover allows access through the access opening into the inside of the leading edge structure and, thus, to the inner surface of the leading edge panel with the attached heater device, so that the heater device can be easily removed and replaced during maintenance without dismounting the entire lower panel.

A further aspect of the present invention relates to a slat for a wing of an aircraft. The slat comprises the leading edge structure according to any of the embodiment described before. The features and effects explained above in connection with the leading edge structure apply vis-à-vis also to the slat.

A further aspect of the invention relates to a wing for an aircraft. The wing comprises the leading edge structure according to any of the embodiment described before, which may be arranged e.g., at the leading edge of the main wing, and/or comprises the slat according to any of the embodiment described before. Alternatively, the leading edge structure might be arranged e.g., at the vertical tail plane or at the horizontal tail plane. The features and effects explained above in connection with the leading edge structure and with the slat apply vis-à-vis also to the wing.

A further aspect of the invention relates to an aircraft comprising a leading edge structure according to any of the embodiment described before, and/or comprising a slat according to any of the embodiment described before, and/or comprising a wing according to any of the embodiment described before. The features and effects explained above in connection with the leading edge structure, the slat and the wing apply vis-à-vis also to the aircraft.

BRIEF DESCRIPTION OF THE DRAWINGS

Hereinafter, preferred embodiments of the present invention are described in more detail by means of a drawing.

DETAILED DESCRIPTION OF THE PREFERRED EMBODIMENTS

Figure 1:
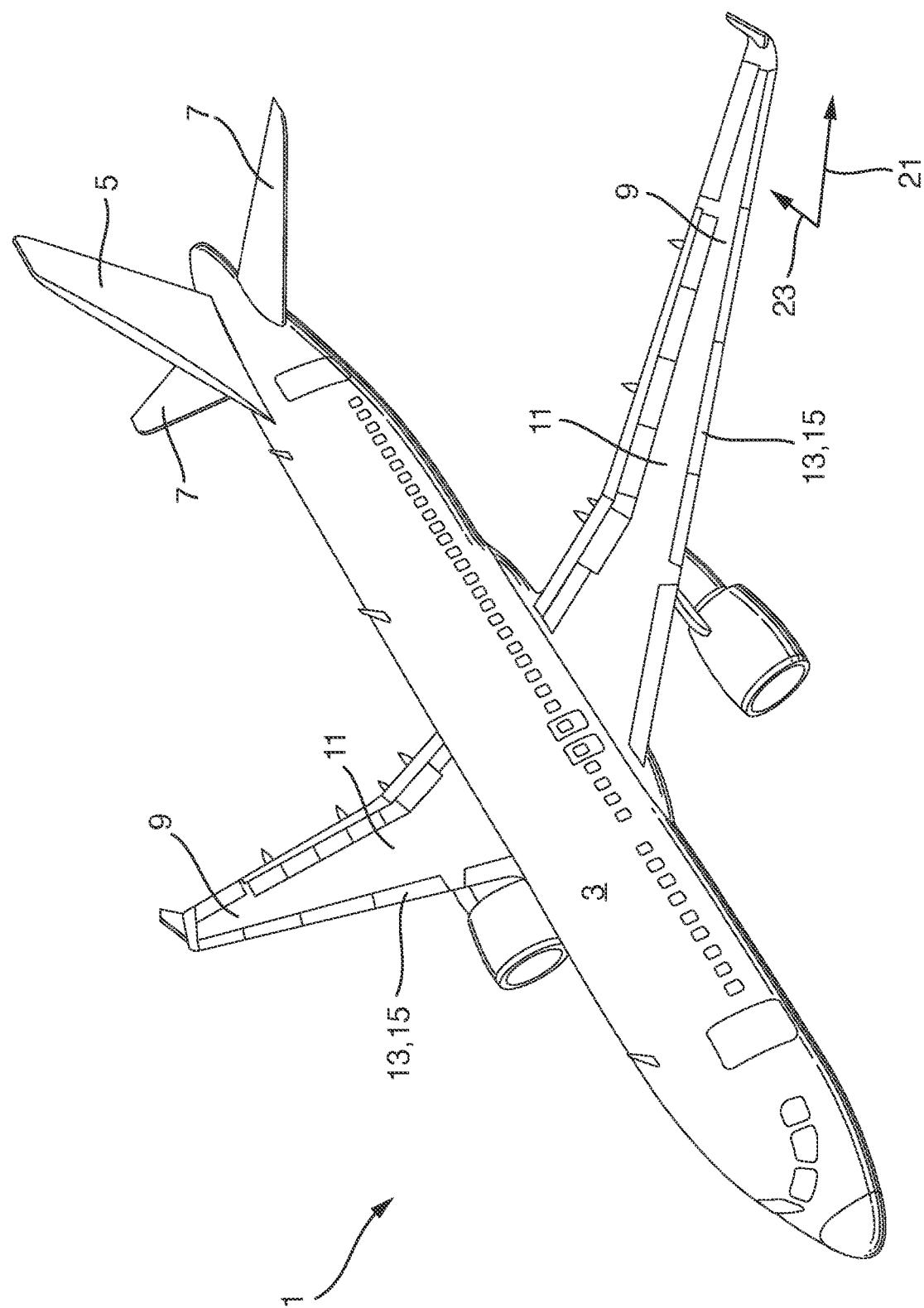
FIG. 1 shows a perspective view of an aircraft according to the invention.

In FIG. 1 an aircraft 1 according to an embodiment of the invention is illustrated. The aircraft 1 comprises a fuselage 3, wings 9, a vertical tail plane 5 and a horizontal tail plane 7. The wing 9 comprises a main wing 11 and a slat 13 mounted to the main wing 11 movably between a retracted position and an extended position. The slat 13 is shown in FIG. 2 in an isolated form and comprises a leading edge structure 15 according to the invention.

The leading edge structure 15 comprises a leading edge panel 17 and a heater device 19. The leading edge panel 17 extends along a span direction 21 and in a chord direction 23 extends in a way curved about the span direction 21 and including a leading edge point 25. The leading edge panel 17 has an outer surface 27 configured for contact with an ambient flow 28, and an inner surface 29 opposite the outer surface 27 and facing an inside 30 of the leading edge structure 15. The leading edge panel 17 is made of a metal material, in the present embodiment of aluminum, steel or titanium. The heater device 19, in the present embodiment in the form of an electrothermal heater mat, is mounted to the inner surface 29 of the leading edge panel 17 in a way that it covers the inner surface 29 for controlled heating of the leading edge panel 17 to protect the leading edge panel 17 from icing. The heater device 19 is mounted to the inner surface 29 of the leading edge panel 17 in a detachable and replaceable manner by a non-destructively detachable connection.

Figure 2:
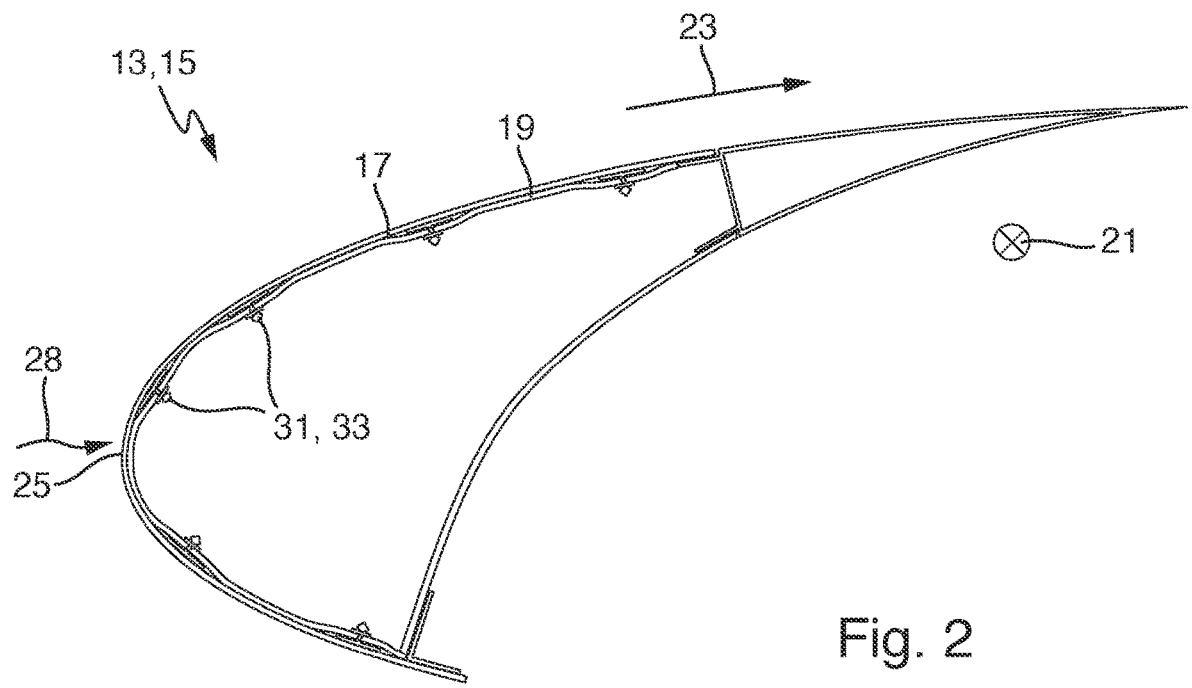
FIG. 2 shows a schematic cross sectional view of a leading edge structure according to a first embodiment of the invention as part of a slat.
Figure 3:
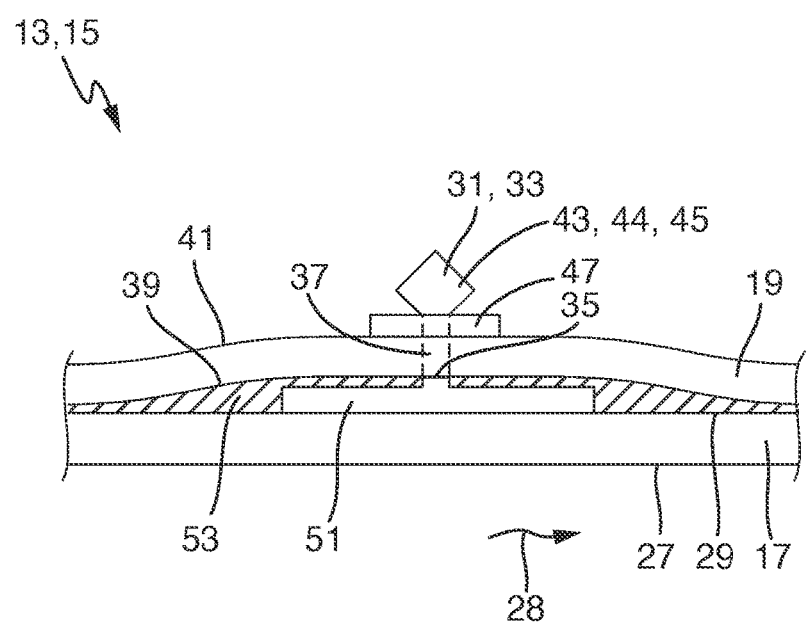
FIG. 3 shows a detailed cross sectional view of a fastener of the leading edge structure shown in FIG. 2.
Figure 4:
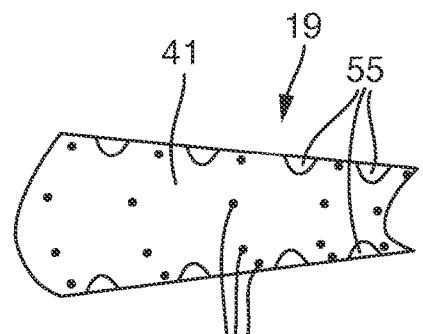
FIG. 4 shows a perspective, isolated view of the heater device from FIG. 2 with a view of the inner side.

The heater device 19 is mounted to the inner surface 29 of the leading edge panel 17 by a fastener arrangement 31 comprising a plurality of discrete releasable fasteners 33 spaced from one another along the inner surface 29 of the leading edge panel 17, as shown in FIGS. 2 and 4. An exemplary fastener 33 is shown in detail in FIG. 3.

As visible in FIG. 3, the fastener 33 is attached by adhesive to the inner surface 29 of the leading edge panel 17 and engages the heater device 19. The fastener 33 comprises a pin 35 extending away from the inner surface 29 of the leading edge panel 17 and engaging a hole 37 in the heater device 19. The hole 37 is formed as a through hole extending through the heater device 19 from an outer side 39 facing the inner surface 29 of the leading edge panel 17 to an opposite inner side 41. The pin 35 is provided with a retainer device 43 at its free end 44 for retaining and securing the pin 35 in the hole 37. The retainer device 43 comprises an extended-diameter head 45 formed at the free end 44 of the pin. The head 45 is formed integrally with the pin 35. In the engaged state the pin 35 extends through the hole 37 such that its free end 44 with the retainer device 43 projects out of the hole 37 at the inner side 41 of the heater device 19, and the retainer device 43 secures the pin 35 in the hole 37.

The retainer device 43 further comprises a removable retainer element 47 arrangeable around the pin 35 between the inner side 41 of the heater device 19 and the head 45, such that the retainer element 47 forms a counter bearing to the inner side 41 of the heater device 19 and the head 45 forms a counter bearing to the retainer element 47. The retainer element 47 is formed as an elastic ring that can be pulled over the head 45 by stretching the ring and thus extending the diameter of the ring.

The at least one fastener 33 comprises a base member 51 in the form of a base plate attached to the inner surface 41 of the leading edge panel 17 by adhesive and holding the pin 35, in the present embodiment being formed integrally with the pin 35. The base member 51 is preferably formed of a metal material having a high thermal conductivity between, so that the heat from the heater device 19 can be transferred to the leading edge panel 17 as unhindered as possible in the area of the base member 51.

Figure 5:
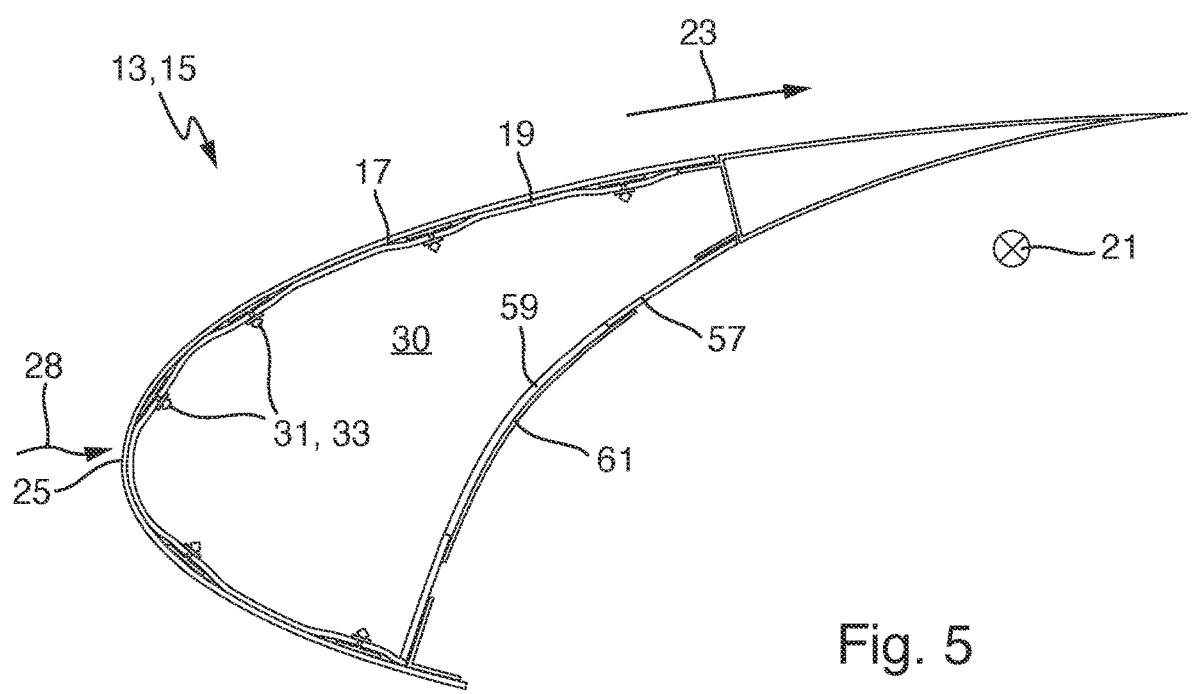
FIG. 5 shows a schematic cross sectional view of a leading edge structure according to a second embodiment of the invention with an access opening in the lower panel.

The heater device 19 is additionally attached to the inner surface 29 of the leading edge panel 17 by an adhesive layer 53 formed between the inner surface 29 of the leading edge panel 17 and the outer side 39 of the heater device 19. The adhesive layer 53 is flexible to avoid delamination upon smaller impacts. Further, the adhesive layer 53 has a high thermal conductivity above 0.5 W/m*K, and has a relatively low adhesive strength of below 0.4 N/mm The chemical composition of the adhesive layer 53 is adapted to have mechanical properties such that it allows a peel of the heater device 19 from the leading edge panel 17 at low forces, preferably ranging below 0.4 N/mm As shown in FIG. 4, to enable gripping of the heater device 19 by hand or by a simple tool a plurality of tabs 55 are distributed along the edges of the heater device 19. Further, the adhesive layer 53 is formed with a temperature dependency, wherein it sustains the loading spectrum of the normal aircraft operation, but at higher temperatures above the operating temperature window of the aircraft 1, e.g., above 100° C., which might be applied during maintenance when the heater device 19 is to be removed, the adhesive layer 53 becomes weak enough so that the heater device 19 can be peeled off by hand or by tool from the leading edge panel 17 at peel forces lower that 0.4 N/mm FIG. 5 shows a further embodiment of the leading edge structure 15 where a lower panel 57 opposite from the leading edge panel 17 and the heater device 19 attached thereto has an access opening 59 closed by a removable cover 61. Removing the cover 61 allows access through the access opening 59 into the inside 30 of the leading edge structure 15 and, thus, to the inner surface 29 of the leading edge panel 17 with the attached heater device 19, so that the heater device 19 can be easily removed and replaced during maintenance without dismounting the entire leading edge panel 17 or lower panel 57.

By the leading edge structure 15 according to the invention as described above, the heater device 19 can be removed and replaced in a very quick and simple manner during maintenance without the need to replace the entire leading edge panel 17. Merely, it might be required to dismount the leading edge panel 17 or some other structure, such as the lower panel 57 or the cover 61, to make the heater device 19 accessible for detachment. This largely simplifies maintenance and reduces costs. At the same time, the heater device 19 does not need to be designed for high impact loads, e.g., due to bird strike, since the heater device 19 is arranged at the inner surface 29 of the leading edge panel 17, which makes the leading edge structure 15 lightweight and cost-efficient.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A heated leading edge structure for an aircraft, comprising
a leading edge panel having an outer surface configured to be contacted by an ambient flow, and an inner surface opposite the outer surface, and
a heater device mounted to the inner surface of the leading edge panel for heating of the leading edge panel,
wherein the heater device is detachably mounted to the inner surface of the leading edge panel,
wherein the heater device is mounted to the inner surface of the leading edge panel by at least one discrete releasable fastener;
wherein the at least one fastener is attached to the inner surface of the leading edge panel; and,
wherein the at least one discrete fastener comprises a pin extending away from the inner surface of the leading edge panel and engaging a hole in the heater device.

2. The leading edge structure according to claim 1, wherein the heater device is formed as a heater mat.

3. The leading edge structure according to claim 1, wherein the at least one discrete releasable fastener comprises a plurality of discrete releasable fasteners spaced from one another along the inner surface of the leading edge panel.

4. The leading edge structure according to claim 1, wherein the at least one fastener is formed as a snap connector that can be engaged to and disengaged from the heater device by elastic deformation of the fastener or the heater device.

5. The leading edge structure according to claim 1,
wherein the hole is formed as a through hole,
wherein the pin is provided with a retainer device at its free end, and
wherein, in an engaged state, the pin extends through the hole such that its free end with the retainer device projects out of the hole and the retainer device secures the pin in the hole.

6. The leading edge structure according to claim 5, wherein the retainer device comprises an extended-diameter head formed at the free end of the pin.

7. The leading edge structure according to claim 6, wherein the retainer device further comprises a removable retainer element arrangeable around the pin between the heater device and the head.

8. The leading edge structure according to claim 1, wherein the at least one discrete releasable-fastener comprises a base member attached to the inner surface of the leading edge panel by adhesive and holding the pin.

9. The leading edge structure according to claim 1, wherein the heater device is additionally attached to the inner surface of the leading edge panel by an adhesive layer.

10. The leading edge structure according to claim 1, further comprising a lower panel opposite from the leading edge panel and from the heater device attached thereto, wherein the lower panel has an access opening closed by a removable cover for access to an inside of the leading edge structure.

11. A slat for a wing of an aircraft, comprising the leading edge structure according to claim 1.

12. A wing for an aircraft, comprising the leading edge structure according to claim 1.

13. A wing for an aircraft, comprising the slat according to claim 11.

14. An aircraft comprising a leading edge structure according to claim 1.

15. An aircraft comprising a slat according to claim 11.

16. An aircraft comprising a wing according to claim 12.

17. A heated leading edge structure for an aircraft, comprising:
a leading edge panel having an outer surface configured to be contacted by an ambient flow, and an inner surface opposite the outer surface, and
a heater device mounted to the inner surface of the leading edge panel for heating of the leading edge panel,
wherein the heater device is detachably mounted to the inner surface of the leading edge panel by a fastener arrangement comprising at least one discrete releasable fastener,
wherein the at least one discrete releasable fastener is attached to the inner surface of the leading edge panel and engages the heater device,
wherein the at least one discrete releasable fastener comprises a pin extending away from the inner surface of the leading edge panel and engaging a hole in the heater device, and
wherein the at least one discrete releasable fastener comprises a base member attached to the inner surface of the leading edge panel by adhesive and holding the pin.

* * * * *